Feb. 17, 1925.
D. H. STRAUS
1,526,443
HORSE COLLAR
Filed July 16, 1924
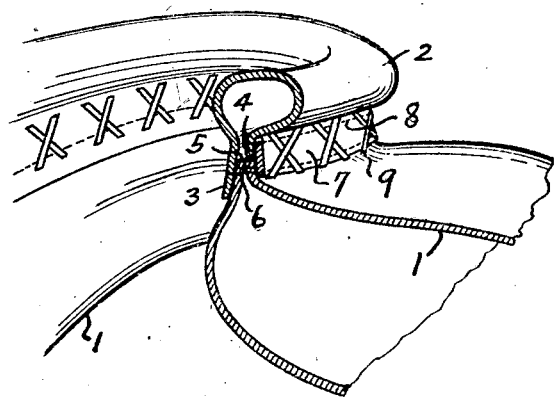
Fig. 1.
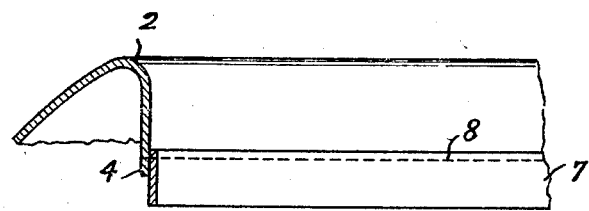
Fig. 2.
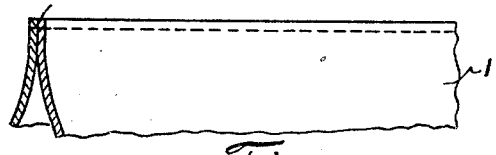
Fig. 3.
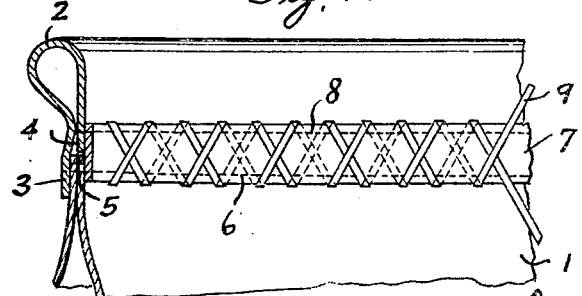
INVENTOR.
David H. Straus.
BY
Hardway Tachy
ATTORNEYS.

Patented Feb. 17, 1925.

1,526,443

UNITED STATES PATENT OFFICE.

DAVID H. STRAUS, OF HOUSTON, TEXAS, ASSIGNOR TO STRAUS-BODENHEIMER COMPANY, OF HOUSTON, TEXAS, A CORPORATION OF TEXAS.

HORSE COLLAR.

Application filed July 16, 1924. Serial No. 726,234.

*To all whom it may concern:*

Be it known that I, DAVID H. STRAUS, a citizen of the United States, residing at Houston, in the county of Harris and State of Texas, have invented certain new and useful Improvements in a Horse Collar, of which the following is a specification.

This invention relates to new and useful improvements in a horse collar.

One object of the invention is to provide a horse collar in which the rim of the collar is secured to the body thereof in a novel manner so as to provide a joint connecting the rim and body which will be easily formed and which at the same time will be strong and durable.

Another object of the invention is to produce a horse collar provided with a reinforced hame groove, or seat, between the rim and body of the collar, in which the hames are securely held so as not to be easily unseated, and of such construction as to withstand the strain and wear to which the collar is subjected by the hames in use.

With the above and other objects in view, this invention has particular relation to certain novel features of construction, arrangement of parts and use an example of which is given in this specification and illustrated in the accompanying drawings, wherein :—

Figure 1 shows a cross sectional view of the collar, said collar being shown in part, in perspective.

Figure 2 shows a fragmentary sectional view showing the body cover and rim cover with their adjacent edges in position for assembly; and, Figure 3 shows a fragmentary outside view of the collar, the rim and body covers being shown in section.

Referring now more particularly to the drawings, wherein like numerals of reference designate similar parts in each of the figures, the numeral 1 designates the cover of the body of the collar and the numeral 2 designates the rim cover. These covers are to be filled with the usual packing material (not shown) to give the usual contour to the completed collar.

The inner edges of the body cover 1 are brought together flush, and stitched in that position, as shown in Figure 2, preparatory to assembling the body and rim. The inner edges of the rim cover are brought into adjacent relation with the inside edge 3 of the rim cover extended and overlapping the corresponding edge of the body cover and with the other edge 4, of the rim cover, abutting the flush edges 5, of the body cover, as shown in Figures 1 and 3, and these edges are stitched in this assembled position by a row of stitches 6, through said overlapping edge 3, and also through the flush edges 5, as also shown in said Figures 1 and 3.

The bottom of the hame groove, or seat, is reinforced by means of a welt strip 7. one edge of which, previous to the assembly, is stitched to the edge 4, of the rim cover, by a row of stitches 8, and the other edge of this welt strip 7 is also stitched, in assembled position, to the flush edges of the body cover by the row of stitches 6. The welt strip is thus securely held in position to break the joint, between the rim and body cover, at the bottom of the hame groove or seat.

The adjacent edges, of the rim and body covers, are provided with rows of perforations therethrough, one row on each side of the welt strip 7, the corresponding perforations being oppositely arranged forming pairs. A thong 9 is employed. Beginning at one end of the welt the ends of the thong are passed through opposing perforations and the thong ends are then crossed and passed around the welt strip and back through the next pair of opposing perforations, and again crossed and passed back through the next succeeding pair of opposing perforations, and so on until the rim and body covers are securely together all the way around. The welt strip 7 will be thus securely bound in place by the surrounding turns of the thong 9. The thong is thus laced in criss-cross fashion, the crossings of the thong on the welt strip side being in staggard relation to said crossings on the inner side of the collar.

A very strong joint is thus provided which will hold the rim immovably secured to the body of the collar and providing also a hame groove which will withstand severe strain and wear.

What I claim is:—

1. In a horse collar, a body cover, a rim cover, one of said covers having its edges flush and the other cover having one edge abutting against said flush edges forming a joint, and its other edge overlapping said flush edges and breaking said joint, a welt strip breaking the joint between said abutting edges, and lying opposite said overlapping edge, and a thong laced in criss-cross fashion around said welt and through the adjacent edges of the rim and body covers.

2. In a horse collar, a body cover, a rim cover, one of said covers having its edges fitted closely together substantially flush and the other cover having one of its edges abutting against said edges, and its other edge overlapping the joint thus formed, a welt strip breaking said joint on the opposite side from said overlapping edge, and a thong laced through said overlapping edge and through said other edges on opposite sides of said joint, said thong passing around said welt.

3. In a horse collar, a body cover, a rim cover, one of said covers having its edges fitted together substantially flush and the other cover having one of its edges abutting against said edges, and its other edge overlapping the joint thus formed, a welt strip breaking said joint on the opposite side from said overlapping edge, and a thong laced through said overlapping edge and through said other edges on opposite sides of said joint said thong passing around said welt, and being laced in criss-cross fashion on each side of the joint.

4. In a horse collar, a body cover, a rim ceiver, one of said covers having its edges fitted together substantially flush and the other cover having one of its edges abutting against said edges, and its other edge overlapping the joint thus formed, a welt strip breaking said joint on the opposite side from said overlapping edge, and a thong laced through said overlapping edge and through said other edges on opposite sides of said joint said thong passing around said welt, and being laced in criss-cross fashion on each side of the joint, the crossing of the thong on the welt side being staggered with respect to the crossings of the thong on the overlapping edge side of said joint.

In testimony whereof I have signed my name to this specification in the presence of two subscribing witnesses.

DAVID H. STRAUS.

Witnesses:
W. H. DUNLAY,
WM. A. CATHEY.